(12) United States Patent
Tokoshima

(10) Patent No.: US 8,771,522 B2
(45) Date of Patent: Jul. 8, 2014

(54) METHOD AND APPARATUS FOR TREATING ORGANIC MATTER-CONTAINING WATER

(75) Inventor: Hiroto Tokoshima, Tokyo (JP)

(73) Assignee: Kurita Water Industries Ltd., Tokyo (JP)

( * ) Notice: Subject to any disclaimer, the term of this patent is extended or adjusted under 35 U.S.C. 154(b) by 667 days.

(21) Appl. No.: 12/737,554

(22) PCT Filed: Jul. 27, 2009

(86) PCT No.: PCT/JP2009/063352
§ 371 (c)(1),
(2), (4) Date: Mar. 24, 2011

(87) PCT Pub. No.: WO2010/013677
PCT Pub. Date: Feb. 4, 2010

(65) Prior Publication Data
US 2011/0180491 A1    Jul. 28, 2011

(30) Foreign Application Priority Data
Jul. 28, 2008  (JP) ................. 2008-193626

(51) Int. Cl.
*C02F 1/68* (2006.01)
(52) U.S. Cl.
USPC ............ 210/762; 210/763; 210/220; 210/900
(58) Field of Classification Search
USPC .................. 210/762–763, 220, 900
See application file for complete search history.

(56) References Cited

U.S. PATENT DOCUMENTS

| | | | | |
|---|---|---|---|---|
| 3,052,527 | A | * | 9/1962 | Andrus .................... 422/106 |
| 4,279,883 | A | * | 7/1981 | Izumi et al. ................ 423/584 |
| 4,786,418 | A | * | 11/1988 | Garg et al. .................... 210/673 |
| 5,124,292 | A | * | 6/1992 | Larsen et al. ................. 502/38 |
| 5,447,640 | A | * | 9/1995 | Omi et al. ................ 210/748.19 |
| 5,505,921 | A | * | 4/1996 | Luckoff et al. ............... 423/584 |
| 5,725,781 | A | * | 3/1998 | Bousquet et al. ............. 210/757 |

(Continued)

FOREIGN PATENT DOCUMENTS

| | | |
|---|---|---|
| CN | 1781606 A | 6/2006 |
| JP | S58-064188 | 4/1983 |

(Continued)

OTHER PUBLICATIONS

Taiwan Patent Office, "Office Action for TW 98125395," Mar. 10, 2014.

(Continued)

*Primary Examiner* — Chester Barry
(74) *Attorney, Agent, or Firm* — Manabu Kanesaka

(57) ABSTRACT

Raw water is made to pass through a raw water supply pipe by opening on-off valves, and by closing on-off valves. Oxygen is supplied to the raw water in the raw water supply pipe by opening an on-off valve of an oxygen supply pipe. The resulting raw water containing organic matter and oxygen passes through the raw water supply pipe and enters a catalyst-packed column, thereby contacting a platinum-group metal catalyst onto which hydrogen is adsorbed. This causes the organic matter in the raw water to contact the platinum-group metal catalyst under the presence of dissolved oxygen and hydrogen which is adsorbed onto the metal catalyst. Accordingly, the organic matter in the water to be treated can be easily removed at high efficiency and with low energy consumption.

18 Claims, 2 Drawing Sheets

(56) References Cited

U.S. PATENT DOCUMENTS

| | | | | |
|---|---|---|---|---|
| 5,942,126 | A | * | 8/1999 | Dallmier et al. ............... 210/756 |
| 6,149,820 | A | * | 11/2000 | Pedersen .................... 210/747.8 |
| 6,391,256 | B1 | * | 5/2002 | Moon et al. ..................... 422/14 |
| 7,008,473 | B2 | * | 3/2006 | Butters et al. .................... 96/224 |
| 7,048,857 | B2 | * | 5/2006 | Jangbarwala ................. 210/652 |
| 7,553,422 | B2 | * | 6/2009 | Reitzner et al. ............... 210/681 |
| 2004/0149664 | A1 | * | 8/2004 | Raeder et al. ................. 210/758 |

FOREIGN PATENT DOCUMENTS

| | | |
|---|---|---|
| JP | 2000-334478 | 12/2000 |
| JP | 2001-047044 | 2/2001 |
| JP | 2002-336886 | 11/2002 |
| JP | 2007-185587 | 7/2007 |
| TW | I293036 B | 2/2008 |
| WO | WO 98/47824 | 10/1998 |

OTHER PUBLICATIONS

Huang, Chin-Yuan, "The mechanism and application studies of hydrogenation reaction for metal catalyst on zero-valent metal," Department of Environmental Engineering and Management, Chaoyang University of Technology, Jul. 15, 2004.

* cited by examiner

METHOD AND APPARATUS FOR TREATING ORGANIC MATTER-CONTAINING WATER

RELATED APPLICATIONS

The present application is National Phase of International Application No. PCT/JP2009/063352 filed Jul. 27, 2009, and claims priority from Japanese Application No. 2008-193626, filed Jul. 28, 2008, the disclosure of which is hereby incorporated by reference herein in its entirety.

FIELD OF INVENTION

The present invention relates to methods and apparatuses for treating organic-matter-containing water, and more particularly, to a method and apparatus for removing organic matter, by using a metal catalyst, from water to be treated.

BACKGROUND OF INVENTION

A highly concentrated chemical or cleaning agent is used for washing and surface finishing of electronic components, and a large amount of pure water is used for rinsing of them. Then, development of a high-level water treatment technique is desired so as to improve water quality of pure water or recycling efficiency of drain water.

In a step of producing ultra-pure water, a biological treatment or physicochemical treatment is widely conducted as a method for removing a TOC (total organic carbon) component from water to be treated.

For example, there is a method in which a TOC component is removed by biologically treating organic-matter-containing drain water and then the biologically treated water is purified through a reverse osmosis membrane (RO membrane) (e.g., Patent Document 1).

In addition, for the physicochemical treatment, there are methods such as the following (1) to (3).

(1) A method for removing organic matter by passing organic-matter-containing drain water directly through an RO membrane separation device.

(2) A method for thermolysis of organic matter by adding an oxidizing agent to organic-matter-containing drain water.

(3) A method for degrading organic matter by irradiating organic-matter-containing drain water with ultraviolet (UV) light (e.g., Patent Document 2).

As Patent Document 1 indicates, for a method for passing water through an RO membrane separation device following biological treatment of organic-matter-containing drain water, there is a problem that the membrane flux decreases because biological metabolites generated in the removal of organic matter by microorganisms clog the membrane surface of a RO membrane. Additionally, the power consumption of a water-feeding pump of an RO membrane separation device is large.

There is a problem with the above methods (1) to (3) in that each of them has large energy consumption.

In method (1), the power for driving a pressure pump for supplying water to an RO membrane separation device is large. When organic-matter-containing drain water passes directly through the RO membrane separation device, this organic-matter-containing drain water having a high TOC concentration readily results in biofouling in the RO membrane separation device. In addition, when the organic matter in the organic-matter-containing drain water is persistent organic matter, an example of which being a low-molecular-weight nitrogen compound (e.g., urea), the removal efficiency is extremely low.

Method (2) requires a large amount of heat energy in a thermolysis device at the time of heating, by using steam, etc., the organic-matter-containing drain water to which an oxidizing agent has been added.

Method (3) requires a large amount of power for UV irradiation. Besides, even for this UV irradiation, the degradation efficiency is extremely low when the organic matter in the organic-matter-containing drain water is persistent organic matter.

Patent Document 1: Japanese Unexamined Patent Application Publication No. 2002-336886
Patent Document 2: Japanese Unexamined Patent Application Publication No. 2007-185587

SUMMARY OF INVENTION

It is an object of the present invention to provide a method and apparatus for treating organic-matter-containing water, which can remove organic matter in water to be treated, with low energy consumption.

The first embodiment of a method for treating organic-matter-containing water of the present invention is characterized by removing organic matter by causing platinum-group metal catalyst to contact water to be treated containing the organic matter.

The second embodiment of a method for treating organic-matter-containing water according to the first embodiment is characterized in that the platinum-group metal catalyst adsorbs hydrogen.

The third embodiment of a method for treating organic-matter-containing water according to the second embodiment is characterized in that the water to be treated contains dissolved oxygen.

The fourth embodiment of a method for treating organic-matter-containing water according to the second and third embodiments is characterized by alternately performing a step of causing hydrogen to be adsorbed which causes the hydrogen to be adsorbed by supplying the hydrogen to the platinum-group metal catalyst and a step of removing organic matter which causes the organic matter to be removed by causing the water to be treated to contact the platinum-group metal catalyst that has adsorbed this hydrogen.

The fifth embodiment of a method for treating organic-matter-containing water according to the fourth embodiment is characterized in that a plurality of reaction containers that contain the platinum-group metal catalyst are used, wherein when a certain reaction container is used to carry out the step of causing hydrogen to be adsorbed, an additional reaction container is used to carry out the step of removing organic matter.

The sixth embodiment of a method for treating organic-matter-containing water according to any of the first to fifth embodiments is characterized in that the platinum-group metal catalyst includes microparticles of a platinum-group metal.

The seventh embodiment of a method for treating organic-matter-containing water according to the sixth embodiment is characterized in that the microparticles of the platinum-group metal are supported on a supporting member.

The eighth embodiment of a method for treating organic-matter-containing water according to any one of the third to seventh embodiments is characterized in that a concentration of the dissolved oxygen in the water to be treated is between 1 ppb and 100 ppb.

The ninth embodiment of a method for treating organic-matter-containing water according to any of the first to eighth embodiments is characterized in that after the water to be treated is caused to contact the platinum-group metal catalyst, this water is caused to contact at least one of an anion exchange resin and a cation exchange resin.

The tenth embodiment of a method for treating organic-matter-containing water according to the ninth embodiment is characterized in that after the water to be treated is caused to contact the platinum-group metal catalyst, this water is deaerated and this deaerated water is then caused to contact at least one of the anion exchange resin and the cation exchange resin.

The eleventh embodiment of a method for treating organic-matter-containing water according to any of the first to tenth embodiments is characterized in that the water to be treated is water to be treated for production of ultrapure water.

The twelfth embodiment of an apparatus for treating organic-matter-containing water is characterized by an apparatus for removing organic matter by causing a hydrogen-adsorbed platinum-group metal catalyst to contact water to be treated containing the organic matter and dissolved oxygen, the apparatus comprising a plurality of reaction containers each containing a platinum-group metal catalyst; water-supplying means for supplying the water to be treated to the reaction containers; hydrogen-supplying means for supplying hydrogen to the reaction containers; and switching means for switching between the supply of the water to be treated and the supply of the hydrogen to the reaction containers, wherein the switching means is means for sequentially switching between the reaction containers in which a step of causing hydrogen to be adsorbed is carried out by supplying hydrogen; and the apparatus is structured so as to carry out a step of removing organic matter by supplying the water to be treated to a reaction container other than the reaction container in which the step of causing hydrogen to be adsorbed is carried out.

The thirteenth embodiment of an apparatus for treating organic-matter-containing water according to the twelfth embodiment is characterized by the apparatus further comprising ion exchange means having at least one of an anion exchange resin and a cation exchange resin onto which treated water ejected from the reaction container is fed.

The fourteenth embodiment of an apparatus for treating organic-matter-containing water according to the thirteenth embodiment is characterized by the apparatus further comprising a deaeration module into which the treated water ejected from the reaction container is fed, wherein deaerated water from the deaeration module is fed into the ion exchange means.

The method and apparatus for treating organic-matter-containing water of the present invention can readily remove organic matter at low energy because the organic matter is removed by catalysis of a platinum-group metal catalyst following causing organic-matter-containing water to be treated to contact a platinum-group metal catalyst. In the method and apparatus for treating organic-matter-containing water, RO membrane treatment and UV irradiation treatment are not required, and also the energy consumption is low.

In the present invention, inclusion of dissolved oxygen in water to be treated allows the removal efficiency of organic matter to improve because a platinum-group metal catalyst adsorbs hydrogen. In addition, the concentration of the dissolved oxygen in the water to be treated is preferably 1 ppb or more.

In a method for treating organic-matter-containing water of the present invention, it is preferable to alternately perform the step of causing hydrogen to be adsorbed which causes the hydrogen to be adsorbed by supplying the hydrogen to a platinum-group metal catalyst and the step of removing organic matter which causes the organic matter to be removed by causing water to be treated to contact the platinum-group metal catalyst that adsorbs the hydrogen. Due to this, it is possible to increase organic matter-removal efficiency by causing hydrogen to be sufficiently adsorbed onto a platinum-group metal catalyst.

In addition, the present invention may be carried out by including a platinum-group metal catalyst in a plurality of reaction containers, by performing the step of removing organic matter in a reaction container while performing the step of causing hydrogen to be adsorbed in other reaction containers, and by switching sequentially the reaction container in which the step of causing hydrogen to be adsorbed is carried out. This allows treatment for removing the organic matter from the water to be treated to be carried out continuously.

This platinum-group metal catalyst may include microparticles of a platinum-group metal. These microparticles of the platinum-group metal may be supported on the surface of a supporting member. In addition, the platinum-group metal catalyst may be formed by plating a base (e.g., a ceramic ball) with a film made of a platinum-group metal such as platinum.

In the present invention, after water to be treated is made to contact the platinum-group metal catalyst, this water may be made to contact at least one of an anion exchange resin and a cation exchange resin. This allows organic acid generated by degradation of TOC to be subjected to adsorptive removal by an ion exchange resin. In addition, before being made to contact the ion exchange resin, the water treated with the platinum-group metal catalyst may be subjected to deaeration treatment. This allows carbon dioxide generated by degradation of organic matter, etc., to be removed, so that the carbonate ion load for the anion exchange resin is reduced.

The present invention is suitable for treatment of raw water (e.g., municipal water, well water, surface stream water, water drained from drafting process of a semiconductor or electronic component) so as to produce ultrapure water. The present invention is suitable for treatment of raw water having an organic matter concentration of 1 to 1,000 ppb as TOC, and more particularly, about 1 to 50 ppb.

DETAILED DESCRIPTION

Figure 1:
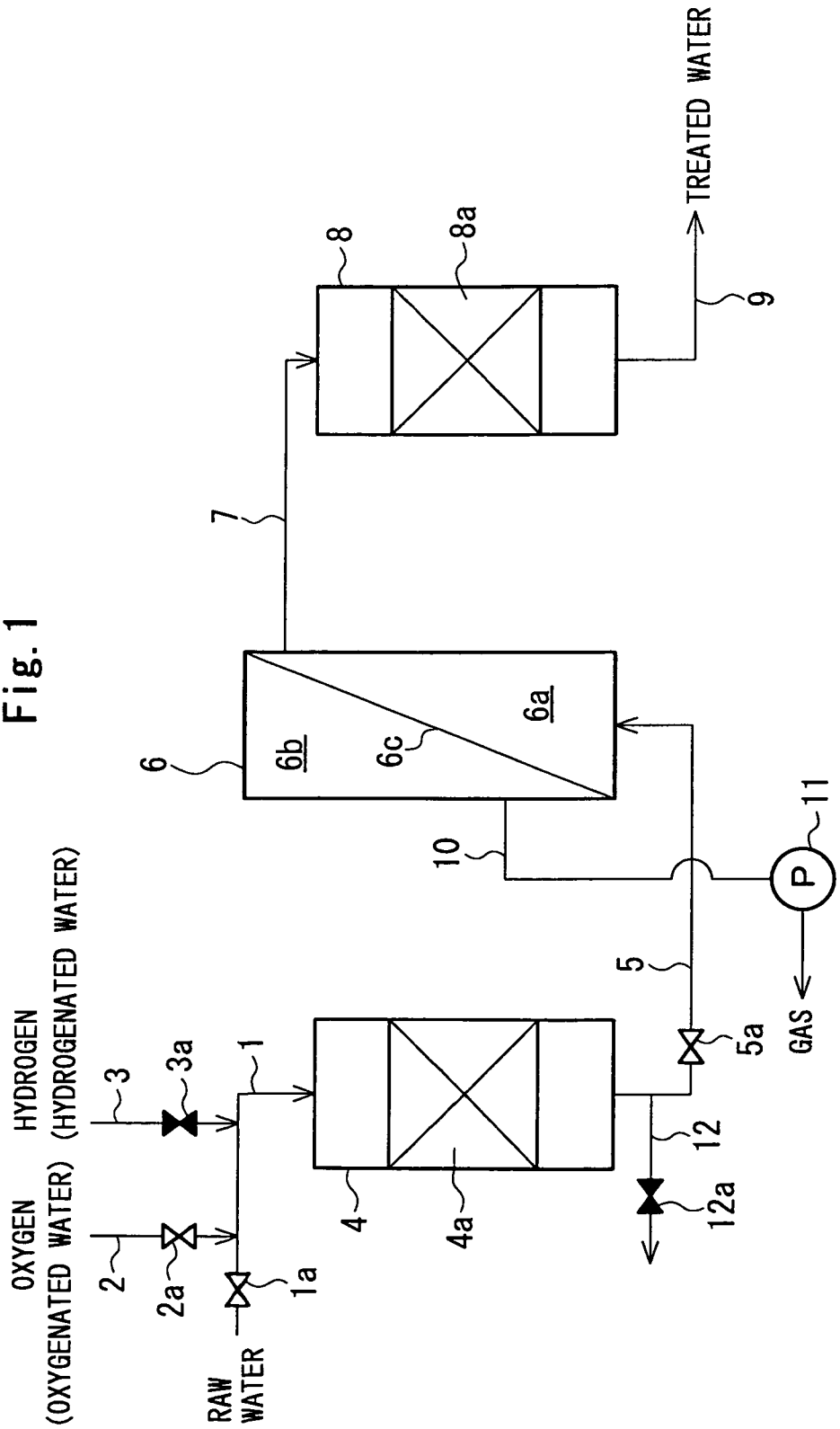
FIG. 1 is a systematic diagram showing an embodiment of a method and apparatus for treating organic-matter-containing water of the present invention.

Hereinafter, by referring to the drawings, embodiments of a method and apparatus for treating organic-matter-containing water of the present invention are described in detail.

First Embodiment

FIG. 1

FIG. 1 is a systematic diagram showing an embodiment of a method and apparatus for treating organic-matter-containing water of the present invention. In FIG. 1, the on-off valves in a closed state are colored black, and the on-off valves in an open state are colored white inside. First, the structure of a treatment apparatus is illustrated.

<Structure of Treatment Apparatus>

As illustrated in FIG. 1, a raw water supply pipe 1 having an on-off valve 1a is connected to an inlet of a catalyst-packed column (reaction container) 4. An oxygen supply pipe 2 having an on-off valve 2a and a hydrogen supply pipe 3 having an on-off valve 3a are connected partway along the raw water supply pipe 1.

A platinum-group metal catalyst 4a is contained (i.e., is packed in this embodiment) in the catalyst-packed column 4. Hydrogen is adsorbed onto this platinum-group metal catalyst 4a. Details of the catalyst-packed column 4 are described below.

An outlet of the catalyst-packed column 4 is connected to a liquid-phase chamber 6a of a deaerating membrane module 6 via an efflux pipe 5 having an on-off valve 5a. Partway along the efflux pipe 5, an extracting pipe 12 having an on-off valve 12a branches off.

The deaerating membrane module 6 is divided by a gas-permeable membrane 6c into the liquid-phase chamber 6a and a gas-phase chamber 6b. The gas-phase chamber 6b is connected to a vacuum pump 11 via a pipe 10.

The gas-permeable membrane 6c is a membrane that gas (e.g., oxygen, nitrogen, carbon dioxide, steam) permeates, but water does not. For example, a silicone membrane, a polytetrafluoroethylene membrane, a polyolefin membrane, a polyurethane membrane, or the like can be used.

The pressure of the reduced pressure side (gas-phase chamber 6b) of the deaerating membrane module 6 is preferably 5 to 10 kPa. Since some steam permeates the gas-permeable membrane 6c into the reduced pressure side, it is preferable to prevent a decrease in membrane capacity by passing gas such as nitrogen through the reduced pressure side and by removing water. When the pressure of the reduced pressure side is less than 5 kPa, the amount of steam that permeates the gas-permeable membrane 6c is likely to become excessive. When the pressure of the reduced pressure side exceeds 10 kPa, the gas removal efficiency is likely to become lower. The flow rate of gas (e.g., nitrogen) in the gas-phase chamber 6b is preferably 5 to 25% by volume of the amount of water passing into the liquid-phase chamber 6a. Use of this deaerating membrane module 6 enables oxygen dissolved in water and carbon dioxide dissolved in water to be removed.

The liquid-phase chamber 6a of the deaerating membrane module 6 is connected to an inlet of an ion exchange resin column 8 via a pipe 7.

An ion exchange resin 8a is packed into the ion exchange resin column 8. The ion exchange resin column 8 is preferably a non-renewable mixed-bed ion exchange device in which a strong acid cation exchange resin and a strong base anion exchange resin are mixed and packed as the ion exchange resin 8a depending on the ion load. Ultrapure water that has extremely low electrical conductivity can be yielded by completely removing cations and anions from water by using the mixed-bed ion exchange device. In the ion exchange resin column 8, the remaining organic matter and organic acid, etc., that is generated during the process of degrading organic matter are also removed.

An outlet of the ion exchange resin column 8 is connected to a treated water pipe 9.

<Structure of Catalyst-Packed Column 4>

Examples of the platinum-group metal of the platinum-group metal catalyst 4a packed into the catalyst-packed column 4 can include ruthenium, rhodium, palladium, osmium, iridium, and platinum. Among these platinum-group metals, one of them can be used alone, or two or more of them can be instead used in combination. In addition, they can be used as an alloy including two or more metals. In addition, the purified product of a naturally produced mixture can also be used without being separated into individual metals. Among them, individual platinum, palladium, an alloy of platinum and palladium, or a mixture of two or more kinds of them can be particularly preferably used because of the strong catalytic activity.

This platinum-group metal catalyst 4a may be microparticles of the platinum-group metal or may be a metal-supported catalyst in which nanocolloidal particles of the platinum-group metal are supported on the surface of a supporting member. In addition, the platinum-group metal catalyst may be formed by plating a base (e.g., a ceramic ball) with a film made of a platinum-group metal such as platinum.

Examples of a method for producing nanocolloidal particles of a platinum-group metal are not particularly limited, and can include, for example, a metal salt reducing reaction method, a combustion method, and the like. Among them, the metal salt reducing reaction method is easy in terms of production, and metal nanocolloidal particles of constant quality can be yielded. Accordingly, this method can be preferably used. The metal salt reducing reaction method can produce the nanocolloidal particles of the platinum-group metal through the following steps: to 0.1 to 0.4 mmol/L of an aqueous solution containing, for example, a chloride, nitrate, sulfate, or a metal complex of a platinum-group metal (e.g., platinum) is added 4 to 20 times the equivalent amount of a reducing agent (e.g., alcohol, a citrate or a salt thereof, formic acid, acetone, or aldehyde) per platinum-group metal; and then the mixture is boiled for 1 to 3 hours. In addition, 1 to 2 mmol/L of hexachloroplatinic acid, potassium hexachloroplatinate, or the like is dissolved into a polyvinylpyrrolidone aqueous solution. A reducing agent (e.g., ethanol) is then added, and the mixture is heated under reflux for 2 to 3 hours under a nitrogen atmosphere so that platinum nanocolloidal particles can be produced.

The weight-average particle size of the nanocolloidal particles of the platinum-group metal is preferably 1 to 50 nm, more preferably 1.2 to 20 nm, and even more preferably 1.4 to 5 nm. If the weight-average particle size of the metal nanocolloidal particles is less than 1 nm, the catalytic activity for the degradation and removal of TOC is likely to decrease. If the weight-average particle size of the metal nanocolloidal particles exceeds 50 nm, the specific surface area of the nanocolloidal particles becomes small. Accordingly, the catalytic activity for the degradation and removal of TOC is likely to decrease.

Examples of a supporting member that supports the nanocolloidal particles of the platinum-group metal are not particularly limited, and can include, for example, magnesia, titania, alumina, silica-alumina, zirconia, active carbon, zeolite, diatomite, an ion exchange resin, and the like. Among them, the anion exchange resin can be particularly preferably used. Since the nanocolloidal particles of the platinum-group metal have an electrical double layer and are negatively charged, they are stably supported on the anion exchange resin and are not easily detached. This anion exchange resin is preferably a strong base anion exchange resin that includes a copolymer of styrene and divinylbenzene as a base, and is more preferably a gel-type resin in particular. The exchange group of the anion exchange resin is preferably an OH-group.

The supported amount of the nanocolloidal particles of the platinum-group metal that are supported on a supporting member (e.g., an anion exchange resin) is preferably 0.01 to 0.2% by weight, and more preferably 0.04 to 0.1% by weight. If the supported amount of the metal nanocolloidal particles is less than 0.01% by weight, the catalytic activity for the degradation and removal of organic matter is likely to become insufficient. When the supported amount of the metal nanocolloidal particles is 0-2% by weight or less, catalytic activity sufficient for the degradation and removal of organic matter is realized. It is not usually necessary to support metal nanocolloidal particles of more than 0.2% by weight. In addition, as the supported amount of the metal nanocolloidal particles increases, the possibility of the elution of the metal into water is likely to become larger.

<Step of Removing Organic Matter>

Next, an organic matter-removing step that eliminates organic matter (a TOC component) from water to be treated is described.

In the apparatus described in FIG. 1, the on-off valves $1a$ and $5a$ are opened, the on-off valves $3a$ and $12a$ are closed, and raw water is made to pass through the raw water supply pipe 1.

When the concentration of dissolved oxygen in the raw water is low, the on-off valve $2a$ of the oxygen supply pipe 2 is opened, and oxygen is supplied to the raw water in the raw water supply pipe 1. The supplied amount of oxygen is preferably such an amount that the degradation reaction of organic matter in the raw water can proceed. Specifically, the total of the molar concentration of the dissolved oxygen in the raw water and the oxygen supplied from the oxygen supply pipe 2 is preferably one or more times the molar concentration of the carbon of the organic matter in the raw water, and more preferably five or more times so as to allow the organic matter-removing reaction to sufficiently proceed. The concentration of the dissolved oxygen in the water fed into the catalyst-packed column 4 is preferably 1 ppb or more, for example, 1 to 100 ppb, and particularly 5 to 50 ppb.

The raw water containing organic matter and dissolved oxygen passes through the raw water supply pipe 1 and enters the catalyst-packed column 4, and then is made to contact the platinum-group metal catalyst $4a$ that has adsorbed hydrogen. This causes the platinum-group metal catalyst to contact the organic matter in the raw water under the presence of both hydrogen and oxygen, thereby efficiently degrading and removing the organic matter. When the platinum-group metal catalyst $4a$ is an anion exchange resin on which 0.01 to 0.2% by weight of the nanocolloidal particles of the platinum-group metal are supported, the space velocity (SV) into the catalyst-packed column 4 is preferably 10 to 500 $hr^{-1}$, and particularly about 50 to 300 $hr^{-1}$.

The reason why organic matter is efficiently degraded and removed by the catalysis of the platinum-group catalyst $4a$ under the presence of both hydrogen and oxygen is speculated to be as follows.

Specifically, under the presence of a platinum-group metal catalyst, hydrogen which is adsorbed onto the platinum-group metal catalyst and oxygen in raw water bond with each other, which results in an uneven distribution of electrons on the surface of the platinum-group metal catalyst.

As a result, it is speculated that lone electron pairs in the organic matter (e.g., urea) bond to (is adsorbed onto) electron-sparse portions of the surface of the platinum-group metal catalyst.

Next, when oxygen is made to contact hydrogen to form water by subsequently supplying hydrogen, the bonds of the lone electron pairs break so that the organic matter detaches from the surface of the metal catalyst and returns to its original state. As described above, it is deemed that repeating the adsorption and detachment of the organic matter allows the organic matter to be degraded and to be removed from the raw water.

The water from which the organic matter has been removed as described above passes through the pipe 5 and enters the liquid-phase chamber $6a$ of the deaerating membrane module 6, which removes gas (e.g., carbon dioxide, oxygen, nitrogen).

This deaerated water that is deaerated in the deaerating membrane module 6 passes through the pipe 7 and enters the ion exchange resin column 8. The undegraded organic matter contained in the deaerated water and the organic acid, etc., generated in the process for degrading the organic matter are adsorbed and removed by the ion exchange resin $8a$ in the ion exchange resin column 8. The ion exchange-treated water is drained to outside the system by using the pipe 9.

<Step of Causing Hydrogen to be Adsorbed>

A step of causing hydrogen to be adsorbed is carried out when the amount of hydrogen adsorption of the platinum-group metal catalyst $4a$ in the catalyst-packed column 4 becomes low due to continuation of the step of removing organic matter described above.

Whether or not the amount of hydrogen adsorption of the platinum-group metal catalyst has become low can be determined by, for example, measuring the dissolved oxygen concentration of both the influx water that enters the catalyst-packed column 4 and the efflux water, followed by determining whether or not the concentration difference between them is equal to or less than a predetermined value. That is, if the difference between the dissolved oxygen concentration of the influx water that enters the catalyst-packed column 4 and the dissolved oxygen concentration of the efflux water is equal to or less than a predetermined value, the dissolved oxygen is removed by a reaction with hydrogen because the amount of hydrogen adsorption is sufficient. In contrast, if the difference exceeds the predetermined value, the amount of hydrogen adsorption is insufficient.

At the time of performing the step of causing hydrogen to be adsorbed, first, the on-off valves $1a$ and $2a$ are closed with respect to the on-off state of the valves shown in FIG. 1. After the water in the catalyst-packed column 4 is drained, the on-off valve $5a$ is closed.

Next, the on-off valve $3a$ is opened, and hydrogen is fed into the catalyst-packed column 4 via the pipe 3 and pipe 1 to cause hydrogen to be adsorbed onto the platinum-group metal catalyst $4a$ in the column 4. During this time, the on-off valve $12a$ may be closed to facilitate the hydrogen adsorption by pressurizing the catalyst-packed column 4. Alternatively, the on-off valve $12a$ may be opened to allow hydrogen to pass through the catalyst-packed column 4 so as to drain the hydrogen from the column 4 through the pipe 12.

After hydrogen has been sufficiently adsorbed onto the platinum-group metal catalyst $4a$, the on-off valve $3a$ is closed and the on-off valves $1a$, $2a$, and $12a$ are opened to fill the catalyst-packed column 4 with raw water. Next, the on-off valve $12a$ is closed and the on-off valve $5a$ is opened, so that the on-off state of the valves are set as described in FIG. 1 to reinitiate the step of removing organic matter.

The embodiment described above is an example of the present invention, and the present invention is not limited to the above embodiment.

For example, the step of causing hydrogen to be adsorbed may be skipped, and the platinum-group metal catalyst $4a$ can be replaced with a new one when the amount of hydrogen adsorption of the platinum-group metal catalyst $4a$ becomes low.

In order to eliminate the process for removing hydrogen gas after the hydrogen gas is supplied to the catalyst-packed column 4 in the above step of causing hydrogen to be adsorbed, hydrogenated water, instead of the hydrogen gas, may be supplied through the hydrogen supply pipe 3. Treated water from the treated water pipe 9 or water having a lower TOC concentration than the treated water into which hydrogen has been dissolved can be used as this hydrogenated water.

Oxygenated water, instead of the oxygen gas, may be supplied through the oxygen supply pipe 2. Treated water from the treated water pipe 9 or water having a lower TOC concentration than the treated water into which oxygen has been dissolved can be used as this oxygenated water.

Second Embodiment

FIG. 2

Figure 2:
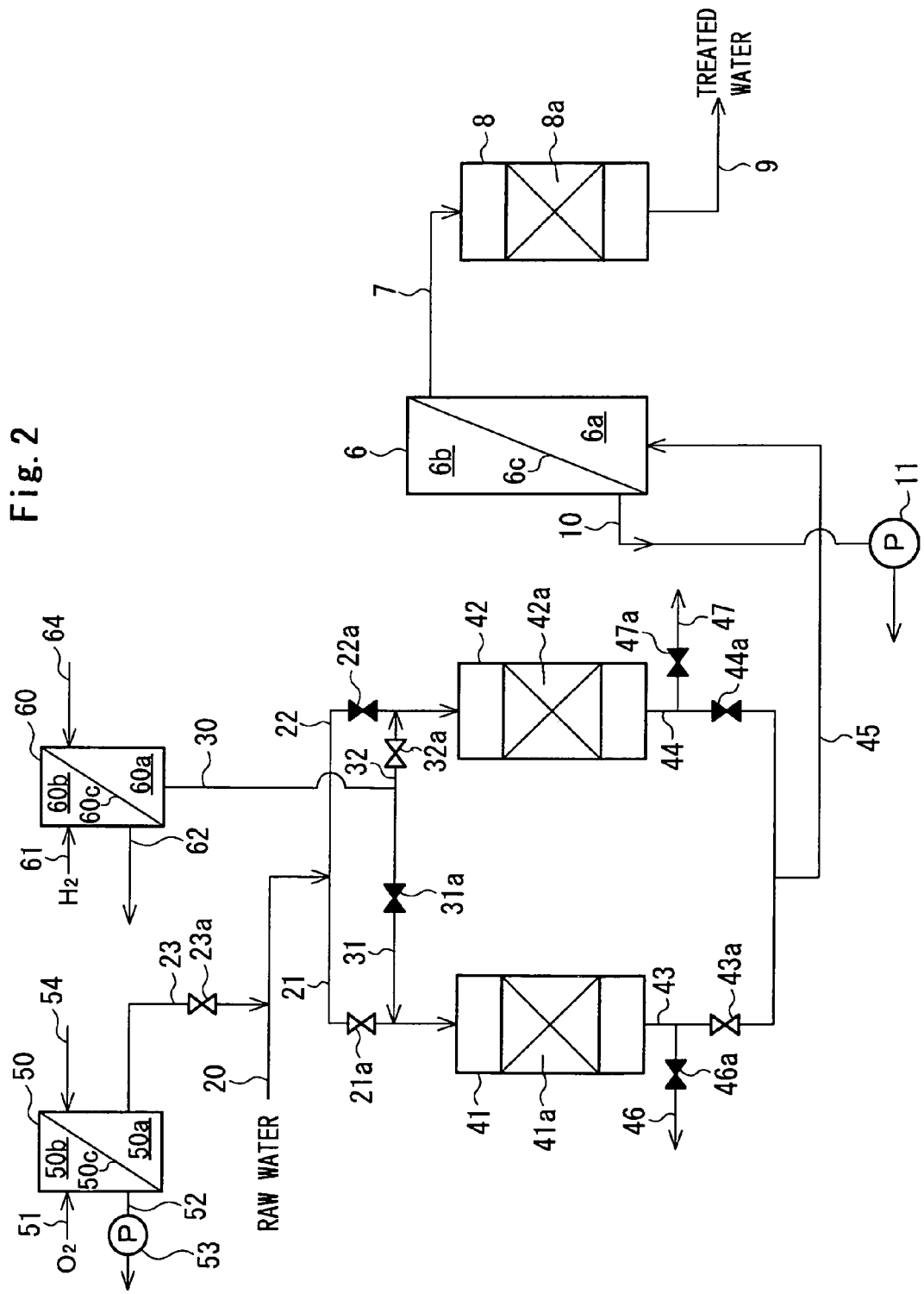
FIG. 2 is a systematic diagram showing another embodiment of a method and apparatus for treating organic-matter-containing water of the present invention.

FIG. 2 is a systematic diagram showing another embodiment of a method and apparatus for treating organic-matter-containing water of the present invention. In FIG. 2, the on-off valves in a closed state are colored black, and the on-off valves in an open state are colored white inside.

This embodiment enables the treatment of water to be treated to be carried out continuously by arranging two parallel catalyst-packed columns, and by varying the timing of performing the step of causing hydrogen to be adsorbed in these catalyst-packed columns.

<Structure of Treatment Apparatus>

A raw water supply pipe 20 branches into a branch pipe 21 having an on-off valve 21a and a branch pipe 22 having an on-off valve 22a. The branch pipes 21 and 22 are connected to the inlets of catalyst-packed columns 41 and 42, respectively. One end of an oxygenated water pipe 23 having an on-off valve 23a is connected partway along the raw water supply pipe 20, and the other end of the pipe 23 is connected to a liquid-phase chamber 50a of an oxygen-dissolving membrane module 50.

The oxygen-dissolving membrane module 50 is divided by a gas-permeable membrane 50c into the liquid-phase chamber 50a and a gas-phase chamber 50b. An oxygen gas supply pipe 51 and a drain pipe 52 having a vacuum pump 53 are connected to the gas-phase chamber 50b. For the liquid-phase chamber 50a, the oxygenated water supply pipe 23 having the on-off valve 23a as described above is connected to the liquid-phase chamber 50a to which a water supply pipe 54 is connected. Treated water from a treated water pipe 9 as described below or water having a lower TOC concentration than the treated water can be supplied through the water supply pipe 54.

As described below, oxygenated water is produced with the oxygen-dissolving membrane module 50. While oxygen gas is supplied to the gas-phase chamber 50b via an oxygen gas supply pipe 51, water is supplied to the liquid-phase chamber 50a via the water supply pipe 54 as well. A portion of the oxygen gas supplied to the gas-phase chamber 50b permeates through the gas-permeable membrane 50c and dissolves into the water inside the liquid-phase chamber 50a. The remaining portion of the oxygen gas in the gas-phase chamber 50b, as well as steam that permeates through the gas-permeable membrane 50c from the liquid-phase chamber 50a and condensed water thereof, are expelled by the vacuum pump 53 and drained through the drain pipe 52. This oxygenated water in the liquid-phase chamber 50a is fed to the raw water supply pipe 20 via the oxygenated water pipe 23.

The hydrogen-dissolving membrane module 60 is divided by a gas-permeable membrane 60c into a liquid-phase chamber 60a and a gas-phase chamber 60b. A hydrogen gas supply pipe 61 and a drain pipe 62 are connected to the gas-phase chamber 60b. A water supply pipe 64 and a hydrogenated water pipe 30 are connected to the liquid-phase chamber 60a. The hydrogenated water pipe 30 branches into a branch pipe 31 having an on-off valve 31a and a branch pipe 32 having an on-off valve 32a. The branch pipes 31 and 32 are connected to branch pipes 21 and 22, respectively, which branch from the raw water supply pipe 20. Treated water from a treated water pipe 9 described below or water having a lower TOC concentration than the treated water can be supplied through the water supply pipe 64.

As described below, hydrogenated water is produced with the hydrogen-dissolving membrane module 60. While hydrogen gas is supplied to the gas-phase chamber 60b via an hydrogen gas supply pipe 61, water is supplied to the liquid-phase chamber 60a via the water supply pipe 64 as well. A portion of the hydrogen gas supplied to the gas-phase chamber 60b permeates through the gas-permeable membrane 60c and is dissolved into the water inside the liquid-phase chamber 60a. The remaining portion of the hydrogen gas in the gas-phase chamber 60b, as well as steam that permeates through the gas-permeable membrane 60c from the liquid-phase chamber 60a and condensed water thereof, are drained through the drain pipe 62. This hydrogenated water in the liquid-phase chamber 60a is fed, via the hydrogenated water pipe 30 and the branch pipes 31 and 32, to the branch pipes 21 and 22 that are branched from the raw water supply pipe 20.

First ends of efflux pipes 43 and 44 are connected to outlets of catalyst-packed columns 41 and 42, respectively. Second ends of the efflux pipes 43 and 44 merge into a pipe 45. An end of the pipe 45 is connected to a gas-phase chamber 6a of a deaerating membrane module 6.

The structure of the catalyst-packed columns 41 and 42 is similar to that of the catalyst-packed column 4 in FIG. 1.

The efflux pipes 43 and 44 have on-off valves 43a and 44a, respectively. Extracting pipes 46 and 47 having on-off valves 46a and 47a are connected to the portions upstream of the on-off valves 43a and 44a of the efflux pipes 43 and 44, respectively.

The structure of the deaerating-membrane module 6 and the downstream portion thereof are identical to the structure described in FIG. 1, and the same symbols denote members that exhibit identical functions.

Next, an operation example that uses the treatment apparatus having such structures is described.

<Operation Example in Which Raw Water Passes into Catalyst-Packed Column 41>

The on-off valves are set to the on-off state shown in FIG. 2. Specifically, the on-off valves 21a, 23a, 32a, and 43a are opened, and the on-off valves 22a, 31a, 44a, 46a, and 47a are closed.

As described below, while this state allows raw water to be treated with the catalyst-packed column 41, hydrogen is stored onto the platinum-group metal catalyst 42a in the catalyst-packed column 42 as well.

Treatment of Raw Water

After raw water passes through the raw water supply pipe 20 and oxygenated water from the oxygen-dissolving membrane module 50 is supplied through the pipe 23, the mixture is supplied to the catalyst packed column 41 via the branch pipe 21.

This causes the metal catalyst 41a in the column 41 to contact organic matter in the raw water under the presence of both hydrogen and oxygen, thereby efficiently degrading and removing the organic matter.

The water from which the organic matter has been removed passes through the pipes 43 and 45 and enters the liquid-phase chamber 6a of the deaerating membrane module 6, which removes gas (e.g., carbon dioxide, oxygen, nitrogen).

The deaerated water that is deaerated with this deaerating membrane module 6 passes through the pipe 7 and enters the ion exchange resin column 8. Then, the undegraded organic matter and the organic acid, etc., generated in the process for degrading the organic matter are adsorbed and removed by the ion exchange resin 8a in the column 8. The treated water is drained to outside the system by using the treated water pipe 9.

Hydrogen Storage

Hydrogenated water that is produced with the hydrogen-dissolving membrane module 60 passes through the hydrogenated water pipe 30 and the pipe 32 and enters the catalyst-packed column 42. This causes hydrogen to be adsorbed onto the platinum-group metal catalyst 42a in the column 42.

<Operation Example That Raw Water Passes through Catalyst-Packed Column 42>

When the amount of hydrogen adsorption of the platinum-group metal catalyst 41a in the catalyst packed column 41 becomes low due to continuation of the operation example described above, the raw-water supply destination is switched from the catalyst-packed column 41 to the catalyst-packed column 42, and the platinum-group metal catalyst 41a in the catalyst-packed column 41 is made to adsorb hydrogen.

Specifically, in the on-off state of valves in FIG. 2, the on-off valve 32a is closed and the on-off valve 22a is opened. After the catalyst-packed column 42 is filled with raw water, the on-off valve 44a is opened. This state allows the raw water to pass through the catalyst-packed column 42 and be treated.

In addition, the on-off valves 21a and 43a are closed and the on-off valve 46a is opened, and the water in the catalyst-packed column 41 is then drained through the pipe 46. Next, the on-off valve 46a is closed and the on-off valve 31a is opened to supply hydrogenated water to the catalyst-packed column 41, and the platinum-group metal catalyst 41a in the column 41 is made to adsorb hydrogen.

This embodiment enables the treatment of raw water to be carried out continuously by varying the timing of performing the hydrogen adsorption treatment of the catalyst-packed column 41 and the catalyst-packed column 42.

That is, while raw water passes through the catalyst packed column 41 to treat the raw water, hydrogenated water is supplied to the catalyst-packed column 42 to carry out the hydrogen adsorption treatment onto the platinum-group metal catalyst 42a as well. After that, the flow paths of the raw water and the hydrogenated water are switched by opening and closing the on-off valves. Finally, while hydrogenated water is supplied to the catalyst-packed column 41 to carry out the hydrogen adsorption treatment onto the platinum-group metal catalyst 41a, raw water is made to pass through the catalyst-packed column 42 to treat the raw water. This enables raw water to be treated continuously by alternately switching between a catalyst-packed column performing raw water treatment and a catalyst-packed column performing hydrogen adsorption treatment.

In addition, in FIG. 2, two catalyst packed columns are used, but it is possible to continuously carry out treatment by arranging three or more parallel catalyst-packed columns and by switching between the raw water treatment and the hydrogen adsorption treatment.

EXAMPLES

Hereinafter, the present invention is illustrated in detail by using an Example and a Comparative Example.

Example 1

Raw water was treated with the apparatus described in FIG. 1 under the following condition.

Platinum-group metal catalyst (a catalyst resin): "nanosaver" manufactured by Kurita Water Industries Ltd., a platinum-nanocolloid-supported resin, 360 mL.

Deaerating membrane module: "Liqui-Cel G420" manufactured by Celgard LLC.

Ion exchange resin: a mixed resin of a strong base anion exchange resin "KR-UAI" manufactured by Kurita Water Industries Ltd. (221.5 mL) and a strong acid cation exchange resin "KR-UCI" manufactured by Kurita Water Industries Ltd. (138.5 mL).

Flow rate of water: 0.72 L/min.

Synthetic drain water formed by dissolving 3 ppb (carbon equivalent concentration) of urea into ultrapure water was used as raw water.

The on-off valve 2a of the oxygen supply pipe 2 and the on-off valve 3a of the hydrogen supply pipe 3 were closed, so that oxygen and hydrogen were not supplied to the raw water.

The concentration of dissolved oxygen of the raw water at the inlet of the catalyst-packed column 4 was 20 ppb.

The metal catalyst was made to adsorb hydrogen beforehand.

The results demonstrated that the TOC concentration of treated water in the exit pipe 9 from the ion exchange resin column 8 was 1 ppb or less.

Comparative Example 1

The raw water was treated in a manner similar to Example 1 except that a low-pressure UV lamp device "AZ-26" (manufactured by Japan Photo-science Corp.) was used instead of the catalyst-packed column 4 and that the flow rate of the raw water was set to 5 L/min.

The results demonstrated that the TOC concentration of treated water in the exit pipe 9 from the ion exchange resin column 8 was 3 ppb, so that the urea was not degraded.

Although a specific embodiment of the present invention has been described in detail, it is clear to those skilled in the art that various modifications are possible without departing from the intention and scope of the present invention.

In addition, the present application claims priority of Japanese Patent Application No. 2008-193626 filed on Jul. 28, 2008, which is herein incorporated by reference in its entirety.

The invention claimed is:

1. A method for treating organic-matter-containing water, comprising:
   supplying water containing organic matter and dissolved oxygen to a catalyst-packed column comprising a platinum-group metal catalyst having hydrogen adsorbed thereon;
   contacting the water with the platinum-group metal catalyst with the hydrogen adsorbed thereon, thereby removing the organic matter;
   shutting off the supplying of the water to the catalyst packed column; and
   supplying the hydrogen to the catalyst-packed column after the shutting off the supplying of the water,
   wherein the supplying of the hydrogen to the catalyst-packed column and the contacting of the water with the platinum-group metal catalyst are performed alternately.

2. The method for treating organic-matter-containing water according to claim 1, further comprising using a plurality of reaction containers that contain the platinum-group metal catalyst,
   wherein when one of the reaction containers is used for the platinum-group metal catalyst to adsorb the hydrogen thereon, another one of the reaction containers is used for the removing of the organic matter.

3. The method for treating organic-matter-containing water according to claim 1, wherein the platinum-group metal catalyst includes microparticles of a platinum-group metal.

4. The method for treating organic-matter-containing water according to claim 3, wherein the microparticles of the platinum-group metal catalyst are supported on a supporting member.

5. The method for treating organic-matter-containing water according to claim 1, wherein a concentration of the dissolved oxygen in the water is in a range between 1 ppb and 100 ppb.

6. The method for treating organic-matter-containing water according to claim 1, further comprising contacting the water with at least one of an anion exchange resin and a cation exchange resin after the contacting of the water with the platinum-group metal catalyst.

7. The method for treating organic-matter-containing water according to claim 6, further comprising
deaerating the water after passing through the catalyst-packed column, thereby obtaining deaerated water, and
contacting the deaerated water with at least one of the anion exchange resin and the cation exchange resin.

8. The method for treating organic-matter-containing water according to claim 1, wherein the water to be treated is water to be treated for production of ultrapure water.

9. An apparatus for treating organic-matter-containing water, comprising:
a plurality of reaction containers each containing a platinum-group metal catalyst having hydrogen adsorbed thereon;
a water-supplying pipe configured to supply water containing organic matter and dissolved oxygen to the reaction containers so that the water contacts with the platinum-group metal catalyst;
a hydrogen-supplying pipe configured to supply the hydrogen to the reaction containers;
a switch configured to switch between supply of the water to the reaction containers from the water-supplying pipe and supply of the hydrogen to the reaction containers from the hydrogen-supplying pipe, and shut off the supply of the water to the plurality of reaction containers,
wherein the switch switches sequentially between the reaction container in which adsorbing of the hydrogen on the platinum-group metal catalyst is carried out by the supply of the hydrogen, and another reaction container other than the reaction container in which the adsorbing of the hydrogen is carried out after the supply of the hydrogen to the reaction container, said water containing organic matter being supplied to the reaction container and another reaction container alternately.

10. The apparatus for treating organic-matter-containing water according to claim 9, further comprising an ion exchange unit having at least one of an anion exchange resin and a cation exchange resin onto which treated water ejected from the reaction container is fed.

11. The apparatus for treating organic-matter-containing water according to claim 10, further comprising a deaeration module into which the treated water ejected from the reaction container is fed,
wherein deaerated water from the deaeration module is fed into the ion exchange unit.

12. The method for treating organic-matter-containing water according to claim 1, further comprising supplying oxygen to the water before the supplying of the water to the catalyst-packed column when a concentration of the dissolved oxygen in the water does not reach a predetermined value.

13. The method for treating organic-matter-containing water according to claim 12, wherein the predetermined value is 1 ppb.

14. The method for treating organic-matter-containing water according to claim 12, further comprising calculating a difference between a concentration of the dissolved oxygen in the water being supplied to the catalyst-packed column and a concentration of the dissolved oxygen in the water being discharged from the catalyst-packed column, thereby obtaining the predetermined value.

15. The apparatus for treating organic-matter-containing water according to claim 9, further comprising a plurality of connecting pipes connecting the water-supplying pipe and the hydrogen-supplying pipe with the plurality of reaction containers,
wherein the switch comprises a plurality of valves configured to open and close the plurality of connecting pipes.

16. The apparatus for treating organic-matter-containing water according to claim 9, further comprising an oxygen-supplying pipe configured to supply oxygen to the water before the supply of the water to the catalyst-packed column.

17. The apparatus for treating organic-matter-containing water according to claim 16, wherein the oxygen is supplied to the water when the concentration of the dissolved oxygen in the water does not reach a predetermined value.

18. The apparatus for treating organic-matter-containing water according to claim 17, wherein the predetermined value is 1 ppb.

* * * * *